United States Patent
Hemauer (10) Patent No.: US 10,328,781 B2
(45) Date of Patent: Jun. 25, 2019

(54) PROFILE STRAND AND METHOD OF MANUFACTURING A PROFILE STRAND

(71) Applicant: COOPER STANDARD GMBH, Lindau/Bodensee (DE)

(72) Inventor: Stephan Hemauer, Achberg (DE)

(73) Assignee: Cooper Standard GmbH, Lindau/Bodensee (DE)

(*) Notice: Subject to any disclaimer, the term of this patent is extended or adjusted under 35 U.S.C. 154(b) by 299 days.

(21) Appl. No.: 15/312,330

(22) PCT Filed: Nov. 25, 2015

(86) PCT No.: PCT/EP2015/077643
§ 371 (c)(1),
(2) Date: Nov. 18, 2016

(87) PCT Pub. No.: WO2016/087281
PCT Pub. Date: Jun. 9, 2016

(65) Prior Publication Data
US 2017/0080791 A1    Mar. 23, 2017

(30) Foreign Application Priority Data
Dec. 5, 2014 (DE) .................. 10 2014 118 029

(51) Int. Cl.
*E06B 7/16* (2006.01)
*B60J 10/75* (2016.01)
*B60J 10/36* (2016.01)

(52) U.S. Cl.
CPC ............. *B60J 10/75* (2016.02); *B60J 10/36* (2016.02)

(58) Field of Classification Search
CPC ..... B60J 10/75; B60J 10/36; B60J 5/04; B60J 10/70; B60J 10/76; B60J 10/763;
(Continued)

(56) References Cited

U.S. PATENT DOCUMENTS 4,477,507 A * 10/1984 Kunert .................. B60J 10/24
                                                        428/122
5,343,609 A *  9/1994 McManus .............. B60J 10/235
                                                        264/177.17
(Continued)

FOREIGN PATENT DOCUMENTS

JP    S60 47724 A    3/1985
JP    S62 55221 A    3/1987
JP    H08 127241 A   5/1996

OTHER PUBLICATIONS

International Search Report and Written Opinion of the International Searching Authority (10 pages) dated Mar. 17, 2016.

*Primary Examiner* — Chi Q Nguyen
(74) *Attorney, Agent, or Firm* — Jodi A. Reynolds, Esq.; Timothy W. Menasco, Esq.; Harter Secrest & Emery LLP (57) ABSTRACT

A profile strand for a motor vehicle extends in a longitudinal direction and is configured to seal a movable window pane of the motor vehicle. The profile strand comprises an end portion, an end cap and a cover. The end cap is coupled to the end portion. The cover can cover the end cap at least partially. The end cap comprises a base portion with a contact surface and a top surface, the contact surface contacting the end portion and the top surface facing away from the end portion. The cover can be moved from an open position, in which the top surface is exposed, to a cover position, in which the top surface is covered. The cover can be fixed in the cover position. In a method for manufacturing such a profile strand, the end cap is coupled to the end portion by welding.

15 Claims, 7 Drawing Sheets

(58) Field of Classification Search
CPC . B60J 10/78; B60J 10/84; B60J 10/235; B60J 10/16; B60J 10/21; B60J 10/265; B60J 10/74; B60R 13/04; B60R 13/02; Y10T 29/49794
USPC .. 49/493.1, 475.1, 479.1, 482.1, 441, 495.1; 296/29, 209, 203.03
See application file for complete search history.

(56) References Cited

U.S. PATENT DOCUMENTS

| | | | | |
|---|---|---|---|---|
| 6,070,364 | A * | 6/2000 | Berry | B60J 10/235 49/441 |
| 6,146,739 | A * | 11/2000 | Itoh | C08L 23/06 428/122 |
| 6,789,841 | B2 * | 9/2004 | Benkler | B60R 13/04 296/209 |
| 9,493,061 | B2 * | 11/2016 | Goto | B60J 10/233 |
| 2001/0015034 | A1 * | 8/2001 | Omori | B60J 10/16 49/440 |
| 2003/0008103 | A1 * | 1/2003 | Sakuma | B29C 47/0066 428/122 |
| 2011/0109009 | A1 * | 5/2011 | Guellec | B60J 10/78 264/252 |
| 2013/0340348 | A1 * | 12/2013 | Matsuura | E06B 7/22 49/442 |
| 2014/0020302 | A1 * | 1/2014 | Alba | B60J 10/88 49/495.1 |
| 2015/0047264 | A1 * | 2/2015 | Kobayashi | E06B 7/2303 49/440 |

* cited by examiner

PROFILE STRAND AND METHOD OF MANUFACTURING A PROFILE STRAND

TECHNICAL FIELD

The invention relates to a profile strand for a motor vehicle extending in a longitudinal direction. Particularly, the invention relates to a profile strand having an end cap for sealing a movable window pane of the motor vehicle. The invention further relates to a method of manufacturing such a profile strand.

The end cap predominantly serves for closing off an open cross-section of the profile strand. Additionally, the end cap can fulfill a sealing function to reduce an entering of moisture between the profile strand and the motor vehicle. Mostly, the end cap furthermore fulfills a trimming function allowing for a visually appealing closing off of the profile strand.

BACKGROUND OF THE INVENTION

DE 10 2004 019 116 B3 discloses a method of manufacturing a profile strand including a recess and an end cap. The end cap is injection molded to the sealing strip and includes a protrusion engaging with the recess. The end cap is matter bonded to the profile strand.

WO 2005/102758 A1 discloses a profile strand including a face side, a recess and an end cap. The end cap is disposed at the face side and includes a protrusion, which is received in the recess. The end cap is matter bonded to the face side by means of injection molding.

The profile strands mentioned before are mostly used as window channel seals. However, in certain sealing arrangements, for example with a glossy surface, injection molded end caps cannot be used due to them impairing the visual appearance. An object of the invention is to enlarge the application field of end caps in profile strands.

A profile strand for a motor vehicle according to the present invention extends in a longitudinal direction. Particularly, the profile strand serves for sealing a movable window pane of a motor vehicle. The profile strand comprises an end portion, an end cap and a cover. The end cap is coupled to the end portion. The cover can cover the end cap at least partially. The end cap comprises a base portion. The base portion includes a contact surface and a top surface. The contact surface contacts the end portion, whereas the top surface is facing away from the end portion. The cover can be moved from an open position, in which the top surface is exposed, to a cover position, in which the top surface is covered. The cover can be fixed or locked in the cover position.

The cover is preferably formed as a cover flap being pivotable from the open position to the cover position. The cover flap preferably snaps in at the end cap when in the cover position.

Alternatively, the cover can be formed as a cover body that is shiftable into the cover position in the longitudinal direction. Preferably, also the cover body snaps in at the end cap when in the cover position.

The cover and the end cap are coupled to each other by means of a fastening member, preferably a clip. The cover can be pinned onto the end cap or, alternatively, the cover can be integrally formed with the end cap. The cover and the end cap are preferably coupled to each other by a bearing, preferably a flexure bearing, particularly a film hinge.

In accordance with the invention, the end cap and the end portion are coupled to each other by a fastening means. The fastening means is provided in the region of the base portion. Particularly, the end cap and the end portion are matter bonded to each other, in particular by welding. In accordance with the invention, the top surface includes at least one fastening point, particularly at least one welding point.

Moreover, the cover can comprise a function surface. Preferably, the function surface is formed as a sealing surface or as a trimming surface. The sealing surface preferably comprises a first sealing region contacting the end portion and a second sealing region configured to contact, for example, a flange of the motor vehicle.

The base portion can consist of a thermoplastic material, for example a thermoplastic elastomer or a thermoplastic vulcanizate, or of an elastomer. Alternatively or additionally, the cover can consist of a thermoplastic material, for example a thermoplastic elastomer or thermoplastic vulcanizate, or of an elastomer.

The cover can comprise a first sealing region contacting the fastening portion. Alternatively or additionally, the cover can include a second sealing region configured to contact a component of the motor vehicle, particularly a flange. The base portion preferably includes a support portion for supporting the cover. Particularly, the support portion supports the first sealing region.

The profile strand can be configured as a sealing strip. Alternatively or additionally, the profile strand can be configured as a trim strip. The profile strand can comprise a fastening portion. At least the fastening portion can further include a reinforcement. The profile strand can be provided with a sealing portion. Preferably, the profile strand has a trimming portion. The trimming portion preferably comprises a trim strip. The trim strip preferably consists of metal, preferably of stainless steel or aluminum, or, for example, of colored plastics. The trimming portion can alternatively or additionally include a trim foil.

A method of manufacturing such a profile strand comprises the steps of:
a) providing a profile strand according to the invention;
b) fastening the base portion to the end portion in the open position;
c) moving the cover from the open position to the cover position and
d) fixing the cover in the cover position.

The end cap is manufactured separately from the profile strand. For fastening the end cap to the end portion, the end cap can be welded thereto. Visible welding points arise in doing that, as is usual in welding. This is why as yet it was refrained from fastening end caps to end portions of profile strands in this way. Presently, a cover is provided allowing for covering the welding points. Additionally, the cover can be provided with a sealing surface. Thereby, for example, a sealing function for a pillar of the motor vehicle is incorporated into the end cap. The application field of profile strands can thus be enlarged combined with a visually appealing embodiment.

The cover can be configured as a flap or a cover body. The profile strand according to the present invention can be manufactured with little effort, complies with high visual demands and, furthermore, allows for provision of additional functions, such as a sealing function or a trimming function.

BRIEF DESCRIPTION OF THE SEVERAL VIEWS OF THE DRAWINGS

Exemplary embodiments of the invention are explained with the following drawings, wherein.

DETAILED DESCRIPTION OF THE INVENTION

Figure 1:
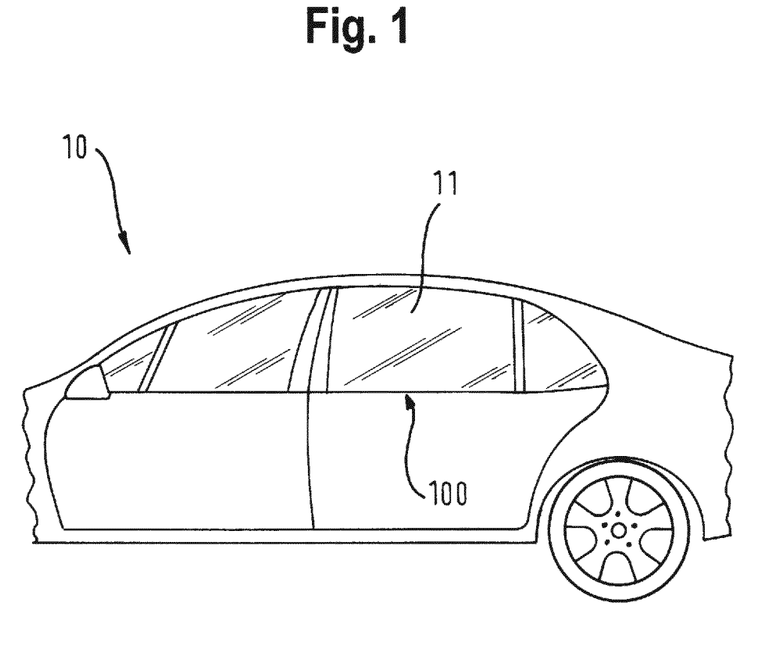
FIG. 1 shows a partial view of a motor vehicle including a profile strand configured as a window channel seal.

FIG. 1 shows a partial view of a motor vehicle 10 that is provided with a profile strand 100. The motor vehicle 10 includes a window pane 11, which is movable in a window channel. The profile strand 100 is configured as a window channel sealing in the present exemplary embodiment, but it can also be configured as a glass guide or as an upper window pane seal.

Figure 2:
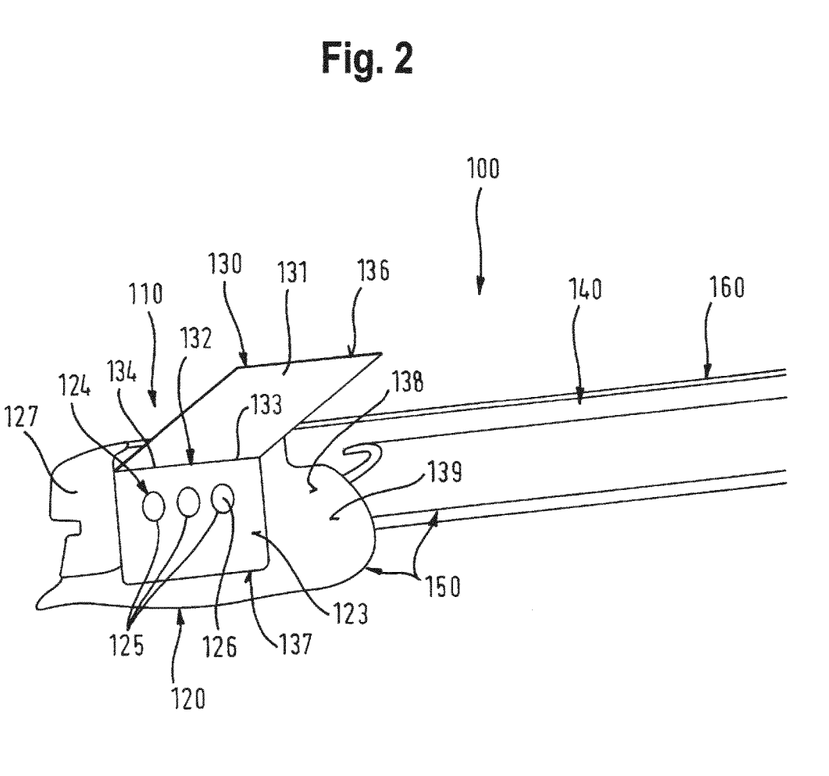
FIG. 2 shows a perspective view of a first embodiment of the profile strand according to the invention with the cover in the open position.
Figure 3:
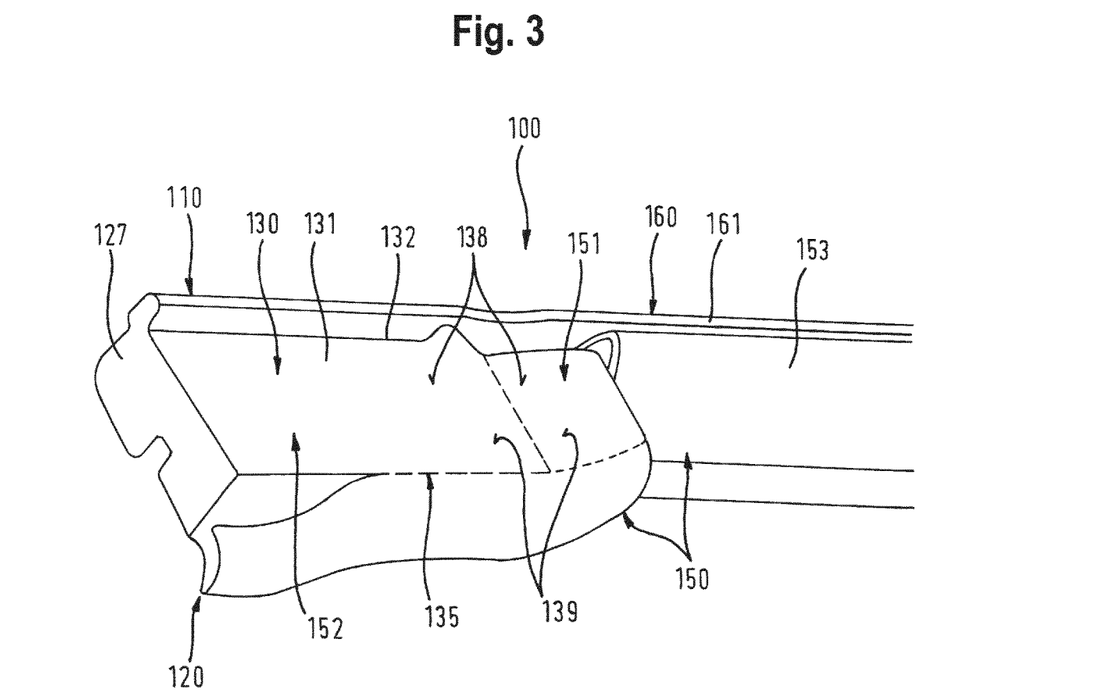
FIG. 3 shows a perspective view of the profile strand according to FIG. 2 with the cover in the cover position.

In the following, it will be referred to FIGS. 2 to 4.

The profile strand 100 extends in a longitudinal direction and comprises an end portion 110 provided with an end cap 120. The profile strand 100 further comprises a cover 130, a fastening portion 140, a sealing portion 150 as well as a trimming portion 160.

The end cap 120 is disposed at the end portion 110 and is made of a thermoplastic material. The end cap 120 comprises a base portion 121 including a contact surface 122 and a top surface 123. The base portion 121 contacts the end portion 110 through the contact surface 122. The contact surface 122 faces the end portion 110, whereas the top surface 123 is facing away from the end portion 110. The end cap 120 is coupled to the end portion 110 by a fastening means 124. The fastening means 124 forms a matter bond between the end portion 110 and the end cap 120. The fastening means 124 includes fastening points 125. Presently, the fastening points 125 are configured as welding points 126, at which the end portion 110 is welded to the end cap 120, particularly the base portion 121.

The end cap 120 further comprises an end plate 127, the end plate 127 essentially extending transversely to the longitudinal direction and covering the end portion 110 at least partially, if seen in cross-section.

The cover 130 is made of the same thermoplastic material as the end cap 120. The cover 130 is integrally formed with the end cap 120 as a covering flap 131. The cover 130 is coupled to the end cap 120 by a bearing 132. Presently, the bearing 132 is configured as a flexure bearing 133. Particularly, the base portion 121 and the covering flap 131 are coupled to each other by a film hinge 134. The cover 130 includes an edge region 136 configured to snap in at a snapping protrusion 137. The snap protrusion 137 is provided at the end cap 120, preferably at the base portion 121.

The cover 130 moreover includes a function surface 138 with a sealing function. The function surface 138 is therefore also referred to as sealing surface 139.

Figure 4:
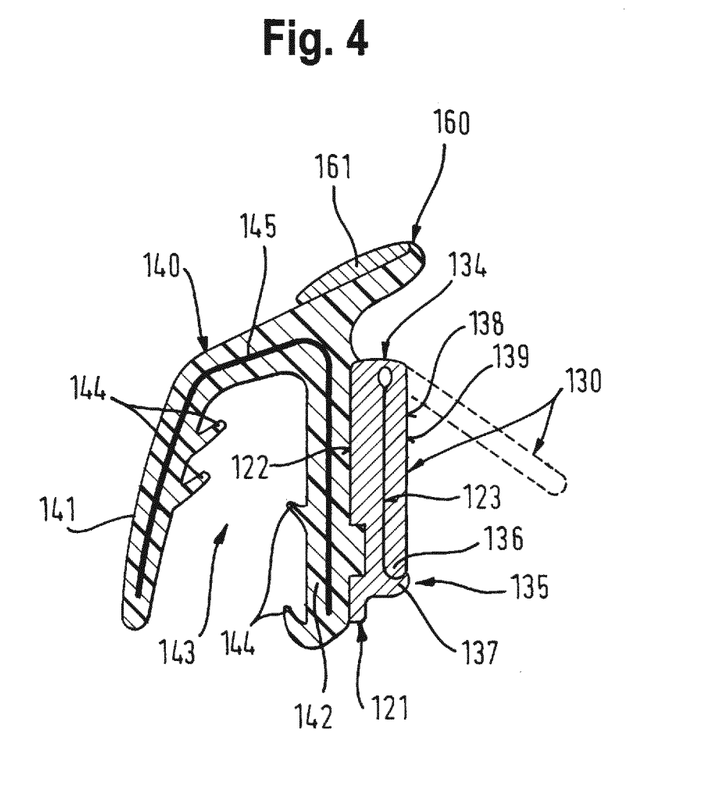
FIG. 4 shows a section view of the profile strand according to FIG. 2 in the region of the end portion.
Figure 7:
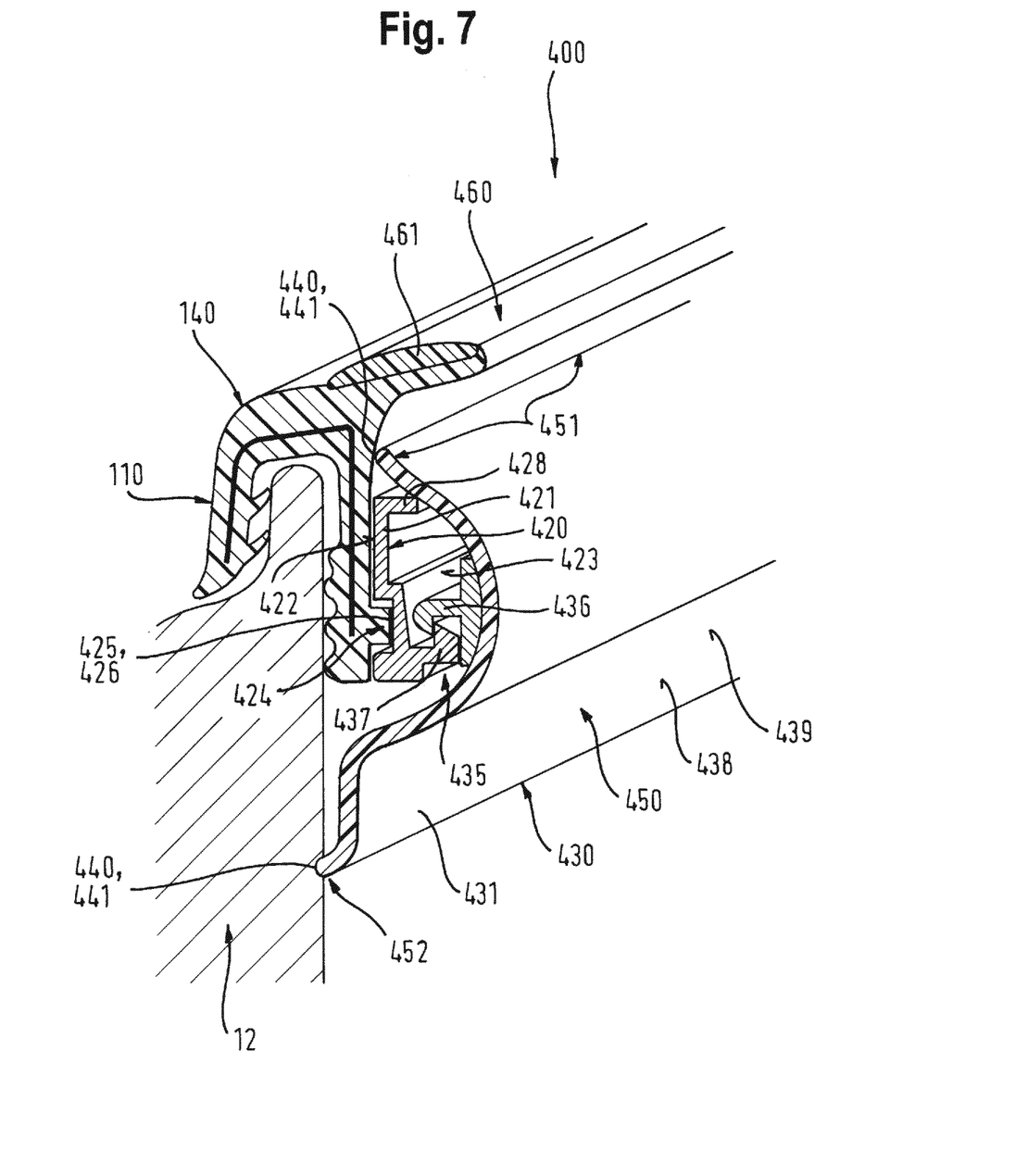

As is shown particularly in FIGS. 4 and 7, the fastening portion 140 comprises a first leg 141 and a second leg 142, which define a receiving region 143 for a flange 12 (see FIG. 7) of the motor vehicle 10. For example, either of the first leg 141 and the second leg 142 includes two fastening lips 144. The fastening portion 140 is provided with a reinforcement 145, particularly formed by a metal carrier, in order to increase the holding force.

The sealing portion 150 includes a first sealing region 151, a second sealing region 152 and at least one sealing lip 153. The first sealing region 151 and the second sealing region 152 are part of the sealing surface 139. The first sealing region 151 runs essentially obliquely to the longitudinal direction from the second sealing region 152. The first sealing region 151 is configured to contact a component of the motor vehicle 10, for example the B-pillar. The second sealing region 152 extends essentially parallel to the longitudinal direction and can also contact the component of the motor vehicle 10, such as the B-pillar. The sealing lip 153 is vulcanized onto the fastening portion 140 and serves for laterally sealing the window pane 11. The trimming portion 160 includes a trim strip 161, which particularly consists of aluminum.

In the following, the manufacturing of the profile strand 100 will be illustrated. At first a profile strand 100 with the end portion 110 and the end cap 120 is provided. The cover 130 is in the open position, so that the top surface 123 is exposed. The end cap 120 is brought into contact with the end portion 110 through the contact surface 122. The end portion 110 and the end cap 120 are being matter bonded by the fastening means 124. In doing so, the base portion 121 is welded to the end portion 110 so that exposed welding points 126 can arise at the top surface 123. After welding the end cap 120 to the end portion 110, the cover 130 is moved from the open position into the cover position, in which the top surface 123 is covered. The cover flap 131 pivots from the open position to the cover position by means of the bearing 132.

The edge region 136 snaps in at the snap protrusion 137 so that a snap connection 135 is formed. The cover 130 is thus fixed in the cover position. When in cover position, the function surface 138 is disposed so as to be able to fulfill its function in the mounted state of the profile strand. This means the sealing surface 139 is provided on the cover 130 so that in cover position a component of the motor vehicle 10 can be sealed.

Following exemplary embodiments of profile strands are only described insofar as they differ from the profile strand 100 described before.

Figure 5:
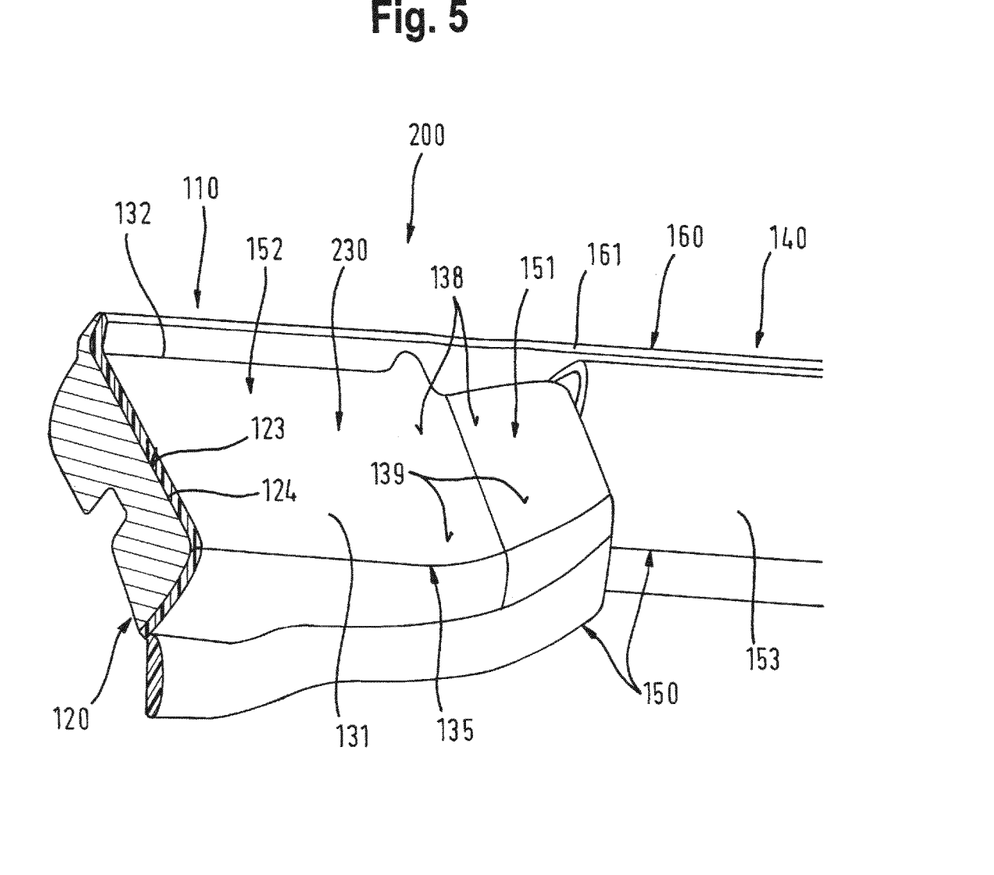
FIG. 5 shows a perspective view of a second exemplary embodiment of the profile strand according to the invention with the cover in the cover position.

In the following, it is referred to FIG. 5, which shows a second exemplary embodiment of the profile strand 200. The profile strand 200 is essentially configured identically to the profile strand 100 and comprises the end portion 110, the end cap 120, the fastening portion 140, the sealing portion 150, and a cover 230. The cover 230 is similar to the cover 130 and is integrally formed with the end cap 120. However, the cover 230 is made of a different material than the end cap 120, namely of a thermoplastic elastomer. Apart from that, the profile strand 200 has an identical structure to the profile strand 100 so that it is not described more in detail.

Figure 6:
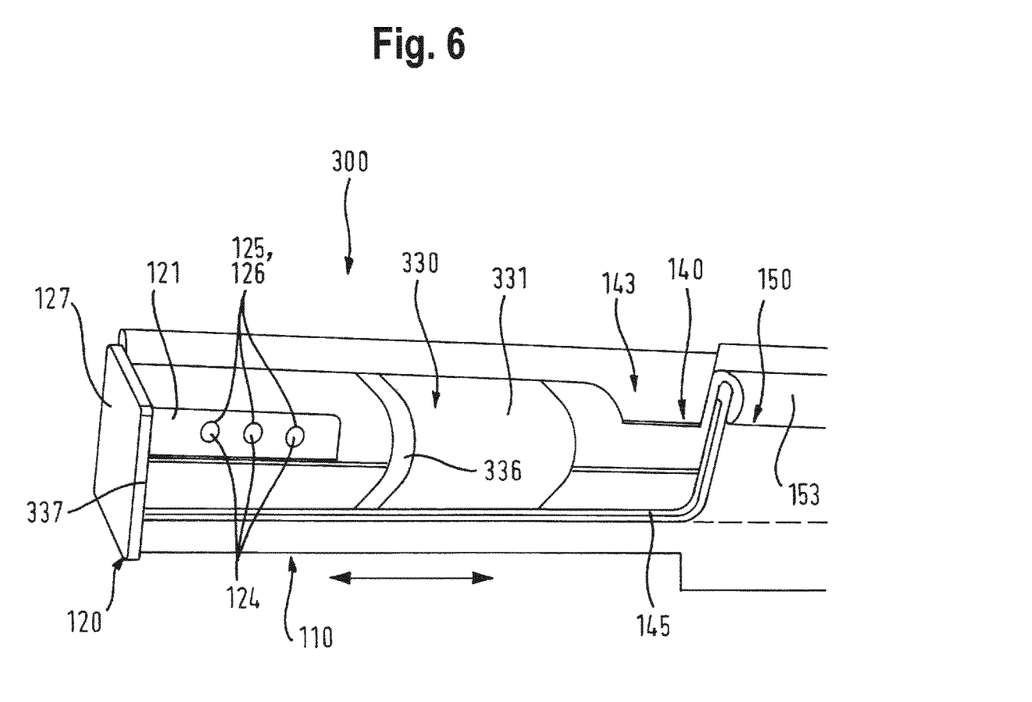
FIG. 6 shows a perspective view of a third exemplary embodiment of the profile strand according to the invention with the cover in the open position and FIG. 7 shows a perspective view of a fourth exemplary embodiment of the profile strand according to the invention with the cover in the cover position.

In the following, it is referred to FIG. 6, which shows a third exemplary embodiment of the profile strand 300. The profile strand 300 is essentially similar to the profile strand 100 or to the profile strand 200. The profile strand 300 comprises a cover 330, which is formed separately from the end cap 120 as cover body 331. The cover 330 includes an edge region 336 capable of snapping in at a snap protrusion 337. The snap protrusion 337 is disposed at the end plate 127. The cover 330 is shiftable in the longitudinal direction of the profile strand 300, as is indicated by the double arrow. As illustrated in FIG. 6, the cover 330 is in the open position, in which the top surface 123 is exposed. The cover 330 can be shifted into the cover position (to the left in FIG. 6) so that the top surface 123 is covered. The edge region 336 snaps in at the snap protrusion 337.

In the following, it is referred to FIG. 7, which shows a fourth exemplary embodiment of the profile strand 400. The profile strand 400 is formed similar to the profile strand 100 and comprises an end cap 420, a cover 430 as well as a sealing portion 450 and a trimming portion 460.

The fastening portion 140 is plugged on a flange 12 of the motor vehicle 10 so that the flange 12 is received in the receiving region 143. The fastening lips 144 contact the flange 12 so that the profile strand 400 is friction-locked with the flange 12. The profile strands 100, 200, 300 described before can also be fastened in this way.

The end cap 420 is disposed at the end portion 110 and made of a thermoplastic material. The end cap 420 comprises a base portion 421, the base portion including a contact surface 422 and a top surface 423, and a support portion 428. The base portion 421 contacts the end portion 110 through the contact surface 422. The contact surface 422 faces the end portion 110, whereas the top surface 423 faces away from the end portion 110. The end cap 420 is coupled to the end portion 110 by a fastening means 424. The fastening means forms a matter bond between the end portion 110 and the end cap 120. The fastening means 424 includes fastening points 425. Presently, the fastening points 425 are configured as welding points 426, to which the end portion 110 with the end cap 120, particularly with the base portion 421, is welded. The support portion 428 essentially runs perpendicularly to the base portion 421 and essentially transverse to the longitudinal direction. The support portion 428 is provided for supporting the cover 430 at least partially.

Preferably, the cover 430 is made of the same thermoplastic material as the end cap 420, but it can also be made of another thermoplastic material. The cover 430 is configured as a cover body 431. The cover 430 is coupled to the end cap 420 by a snap connection 435. The snap connection 435 includes a snap hook 436 and a snap protrusion 437. The snap hook 436 is provided at the cover body 431, whereas the snap protrusion 437 is provided at the base portion 421. The snap connection 435 is configured in such a way that a force in direction of the fastening portion 140 acts on the cover 430 so that the first sealing region 451 and the second sealing region 452 are each pressed against the fastening portion 140 and the flange 12.

The cover 430 includes a function surface 438 configured as a trimming surface 439. The trimming surface 439 can, for example, be configured as a textile imitation. The cover 430 further includes function surfaces 440, which are configured as sealing surfaces 441. The sealing portion 450 includes a first sealing region 451 and a second sealing region 452, which are each part of the sealing surfaces 441. The first sealing region 451 is supported by the support portion 428 and contacts the fastening portion 140. The second sealing region 452 contacts the flange 12 when the profile strand 400 is mounted.

The trimming portion 460 comprises a trim strip 461 and the trimming surface 439. The trim strip 461 is made of plastics, for example.

The profile strands 100, 200, 300, 400 described before can be manufactured by extrusion. The end cap 120, 420 is matter bonded to the end portion 110, particularly by welding. The top surface 123, 423 is covered by the cover 130 230, 330, 430 for complying with high visual demands on the one hand and improving the profile strand 100, 200, 300, 400 with respect to its sealing function on the other hand. Hence, the application field of profile strands 100, 200, 300, 400 with matter bonded end caps 120, 420 can be enlarged.

List of Reference Signs 10 motor vehicle
11 window pane
12 flange
100 profile strand
110 end portion
120 end cap
121 base portion
122 contact surface
123 top surface
124 fastening means
125 fastening point
126 welding point
127 end plate
130 cover
131 cover flap
132 bearing
133 flexure bearing
134 film hinge
135 snap connection
136 edge region
137 snap protrusion
138 function surface
139 sealing surface
140 fastening portion
141 first leg
142 second leg
143 receiving region
144 fastening lip
145 reinforcement
150 sealing portion
151 first sealing region
152 second sealing region
153 sealing lip
160 trimming portion
161 trim strip
200 profile strand
230 cover
300 profile strand
330 cover
331 cover body
336 edge region
337 snap protrusion
400 profile strand
420 end cap
421 base portion
422 contact surface
423 top surface
424 fastening means
425 fastening point
426 welding point
428 support portion
430 cover
431 cover body
435 clip
436 snap hook
437 snap protrusion
438 function surface
439 trimming surface
440 function surface
441 sealing surface
450 sealing portion
451 first sealing region
452 second sealing region
460 trimming portion
461 trim strip

The invention claimed is:

1. A profile strand for a motor vehicle, the profile strand being configured to seal a movable window pane of the motor vehicle, extending in a longitudinal direction, and comprising:
   (a) an end portion;
   (b) an end cap coupled to the end portion by a fastener;
   (c) a cover configured to cover at least a portion of the end cap;
   (d) wherein the end cap comprises a base portion having a contact surface contacting the end portion, and a top surface facing away from the end portion, the top surface including at least one fastening point;
   (e) wherein the fastener is provided in a region of the base portion and includes the at least one fastening point;
   (f) wherein the cover is configured to be fixed in a cover position;
   (g) wherein the cover is movable from an open position, in which the top surface and the at least one fastening point are exposed, to the cover position, in which the top surface and the at least one fastening point are covered.

2. The profile strand according to claim 1, wherein the cover is configured as a cover flap being pivotable from the open position to the cover position, wherein the cover flap snaps in at the end cap, when in the cover position.

3. The profile strand according to claim 1, wherein the cover is configured as a cover body being supported at the end portion, so as to be shiftable from the open position to the cover position along the longitudinal direction, wherein the cover body snaps in at the end cap, when in the cover position.

4. The profile strand according to claim 1, wherein the cover and the end cap are coupled to each other by a clip, wherein the cover is pinned onto the end cap.

5. The profile strand according to claim 1, wherein the cover is integrally formed with the end cap.

6. The profile strand according to claim 5, wherein the cover and the end cap are coupled to each other by a flexure bearing, wherein the flexure bearing is a film hinge.

7. The profile strand according to claim 1, wherein the at least one fastening point is at least a welding point.

8. The profile strand according to claim 1, wherein the cover comprises a function surface configured as a sealing surface, wherein the sealing surface includes a first sealing region contacting the end portion, and a second sealing region configured to contact a component of the motor vehicle, wherein the component is a flange.

9. The profile strand according to claim 1, wherein the cover comprises a function surface configured as a trimming surface.

10. The profile strand according to claim 1, wherein the base portion or the cover consists of a thermoplastic material or an elastomer material, wherein the thermoplastic material is a thermoplastic elastomer or a thermoplastic vulcanizate.

11. The profile strand according to claim 1, wherein the base portion comprises a support portion configured to support the cover.

12. The profile strand according to claim 1, further comprising a fastening portion having a reinforcement.

13. The profile strand according claim 12, further comprising a trimming portion, wherein the trimming portion comprises a trim strip, which consists of a metal, in particular stainless steel or aluminum, or of a synthetic material.

14. The profile strand according to claim 1, further comprising a sealing portion.

15. A method for manufacturing a profile strand for a motor vehicle comprising:
   (a) providing a profile strand according to claim 1;
   (b) fastening the base portion to the end portion in an open position;
   (c) moving the cover from the open position to the cover position; and
   (d) fixing the cover in the cover position.

* * * * *